United States Patent
Wickersham et al.

(10) Patent No.: US 8,933,677 B2
(45) Date of Patent: Jan. 13, 2015

(54) VOLTAGE REGULATOR CONTROLLER FREQUENCY VARIED BY LOAD CURRENT

(75) Inventors: Robert D. Wickersham, Roy, WA (US); James S. Dinh, Lakewood, WA (US); William G. Rider, Shelton, WA (US)

(73) Assignee: Intel Corporation, Santa Clara ( * ) Notice: Subject to any disclaimer, the term of this patent is extended or adjusted under 35 U.S.C. 154(b) by 831 days.

(21) Appl. No.: 12/384,749

(22) Filed: Apr. 8, 2009

(65) Prior Publication Data

US 2010/0259236 A1 Oct. 14, 2010

(51) Int. Cl.
  *G05F 1/00* (2006.01)
  *H02M 3/156* (2006.01)
  *H02M 1/00* (2006.01)

(52) U.S. Cl.
  CPC ...... *H02M 3/156* (2013.01); *H02M 2001/0032* (2013.01); *Y02B 70/16* (2013.01)
  USPC .......................................... 323/282; 323/283

(58) Field of Classification Search
  USPC ................................. 323/282, 283
  See application file for complete search history.

(56) References Cited

U.S. PATENT DOCUMENTS

| | | | | |
|---|---|---|---|---|
| 6,069,807 A | * | 5/2000 | Boylan et al. | 363/97 |
| 7,046,528 B2 | * | 5/2006 | Sankman et al. | 363/41 |
| 7,285,939 B2 | * | 10/2007 | Ito | 323/222 |
| 7,613,019 B2 | * | 11/2009 | Kroes | 363/56.03 |
| 7,772,810 B2 | * | 8/2010 | Buethker et al. | 323/224 |
| 2006/0043953 A1 | * | 3/2006 | Xu | 323/282 |

* cited by examiner

*Primary Examiner* — Jue Zhang
*Assistant Examiner* — Lakaisha Jackson
(74) *Attorney, Agent, or Firm* — Jordan IP Law, LLC

(57) ABSTRACT

In some embodiments, a voltage regulator device may include a variable frequency voltage regulator, a sense circuit coupled to an output of the variable frequency voltage regulator, the sense circuit to sense a signal corresponding to an output condition of the variable frequency voltage regulator, and a frequency adjust circuit coupled between the sense circuit and the variable frequency voltage regulator, the frequency adjust circuit to dynamically adjust an operating frequency of the variable frequency voltage regulator based on the signal sensed by the sense circuit during operation of the variable frequency voltage regulator. For example, the frequency adjust circuit may be configured to adjust the operating frequency of the variable frequency voltage regulator over a range of frequencies for a corresponding range of sensed output conditions. Other embodiments are disclosed and claimed.

14 Claims, 5 Drawing Sheets

VOLTAGE REGULATOR CONTROLLER FREQUENCY VARIED BY LOAD CURRENT

The invention relates to voltage regulators and more particularly to switching voltage regulators.

BACKGROUND AND RELATED ART

Voltage converters are well known in the art. U.S. Pat. Nos. 7,193,397 and 7,498,790 each describe various electronic systems utilizing voltage regulators.

BRIEF DESCRIPTION OF THE DRAWINGS

Various features of the invention will be apparent from the following description of preferred embodiments as illustrated in the accompanying drawings, in which like reference numerals generally refer to the same parts throughout the drawings. The drawings are not necessarily to scale, the emphasis instead being placed upon illustrating the principles of the invention.

DESCRIPTION

In the following description, for purposes of explanation and not limitation, specific details are set forth such as particular structures, architectures, interfaces, techniques, etc. in order to provide a thorough understanding of the various aspects of the invention. However, it will be apparent to those skilled in the art having the benefit of the present disclosure that the various aspects of the invention may be practiced in other examples that depart from these specific details. In certain instances, descriptions of well known devices, circuits, and methods are omitted so as not to obscure the description of the present invention with unnecessary detail.

Figure 1:
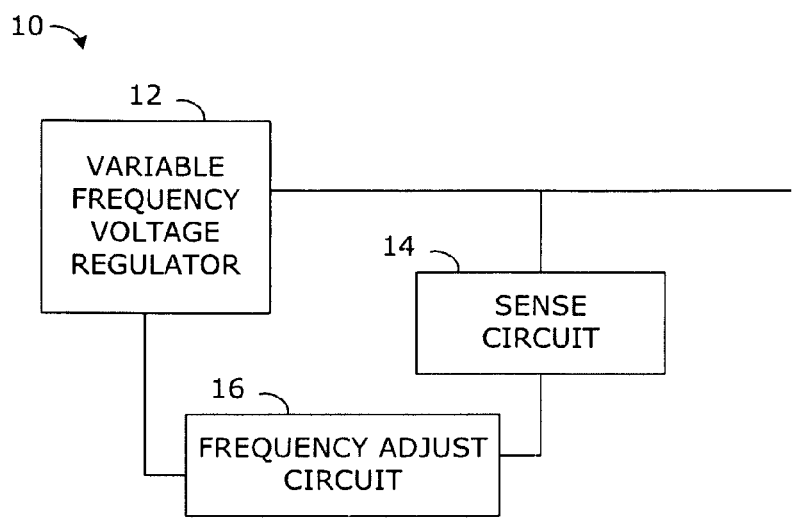
FIG. 1 is a block diagram of a voltage regulator device in accordance with some embodiments of the invention.

With reference to FIG. 1, in accordance with some embodiments of the invention a voltage regulator device 10 may include a variable frequency voltage regulator 12, a sense circuit 14 coupled to an output of the variable frequency voltage regulator 12, the sense circuit 14 to sense a signal corresponding to an output condition of the variable frequency voltage regulator 12, and a frequency adjust circuit 16 coupled between the sense circuit 14 and the variable frequency voltage regulator 12, the frequency adjust circuit 16 to dynamically adjust an operating frequency of the variable frequency voltage regulator 12 based on the signal sensed by the sense circuit 14 during operation of the variable frequency voltage regulator 12. For example, the frequency adjust circuit 16 may be configured to adjust the operating frequency of the variable frequency voltage regulator 12 over a range of frequencies for a corresponding range of sensed output conditions. For example, in some embodiments of the invention the frequency adjust circuit 16 may be configured to adjust the frequency to improve efficiency for the sensed output condition.

For example, in some embodiments of the invention the frequency adjust circuit 16 may be configured to provide a substantially continuous adjustment of the operating frequency over the range of output conditions. In some embodiments of the invention, the frequency adjust circuit 16 may be configured to provide a plurality of incremental adjustments of the operating frequency over the range of output conditions. Advantageously, some embodiments of the voltage regulator device 10 may provide improved efficiency over a relatively wider range of operating conditions by dynamically adjusting the operating frequency of the variable frequency voltage regulator 12 to provide an optimized or better operating frequency for its current load condition.

For example, in some embodiments of the invention, the sensed output condition may correspond to an amount of output current from the variable frequency voltage regulator 12, and the sense circuit 14 may include a current sense circuit. For example, in some embodiments of the invention the frequency adjust circuit 16 may include a voltage scaling circuit configured to receive a voltage signal from the current sense circuit and to convert the received voltage signal to a corresponding input signal coupled to a frequency input of the variable frequency voltage regulator 12.

Figure 2:
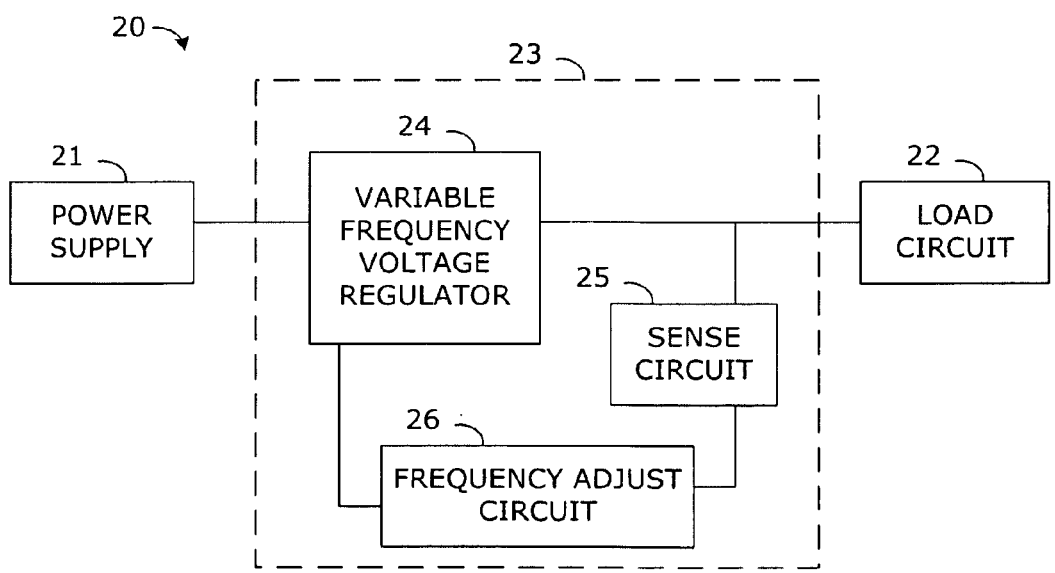
FIG. 2 is a block diagram of an electronic system in accordance with some embodiments of the invention.

With reference to FIG. 2, in accordance with some embodiments of the invention an electronic system 20 may include a power supply 21, a load circuit 22, and a voltage regulator device 23 coupled between the power supply 21 and the load circuit 22, wherein the voltage regulator device 23 may include a variable frequency voltage regulator 24, a sense circuit 25 coupled to an output of the variable frequency voltage regulator 24, the sense circuit 25 to sense a signal corresponding to an output condition of the variable frequency voltage regulator 24, and a frequency adjust circuit 26 coupled between the sense circuit 25 and the variable frequency voltage regulator 24, the frequency adjust circuit 26 to dynamically adjust an operating frequency of the variable frequency voltage regulator 24 based on the signal sensed by the sense circuit 25 during operation of the variable frequency voltage regulator 24. For example, the frequency adjust circuit 26 may be configured to adjust the operating frequency of the variable frequency voltage regulator 24 over a range of frequencies for a corresponding range of sensed output conditions. For example, the frequency adjust circuit 26 may be configured to adjust the frequency to improve efficiency for the sensed output condition.

For example, in some embodiments of the system 20 the frequency adjust circuit 26 may be configured to provide a substantially continuous adjustment of the operating frequency over the range of output conditions. In some embodiments of the system 20, the frequency adjust circuit 26 may be configured to provide a plurality of incremental adjustments of the operating frequency over the range of output conditions. Advantageously, some embodiments of the electronic system 20 may provide improved efficiency over a relatively wider range of operating conditions by dynamically adjusting the operating frequency of the variable frequency voltage regulator 24 to provide an optimized or better operating frequency for its current load condition.

For example, in some embodiments of the system 20 the sensed output condition may correspond to an amount of output current from the variable frequency voltage regulator 24 and the sense circuit 25 may include a current sense circuit. For example, in some embodiments of the system 20 the frequency adjust circuit 26 may include a voltage scaling circuit configured to receive a voltage signal from the current sense circuit and to convert the received voltage signal to an corresponding input signal coupled to a frequency input of the variable frequency voltage regulator 24. For example, the power supply 21 may include a battery. For example, the load circuit 22 may include a processor. For example, the electronic system 20 may correspond to a processor-based system such as a server, a desktop computer, or a portable computing device such as a notebook computer, a netbook, a cell phone, or a personal digital assistant.

Figure 3:
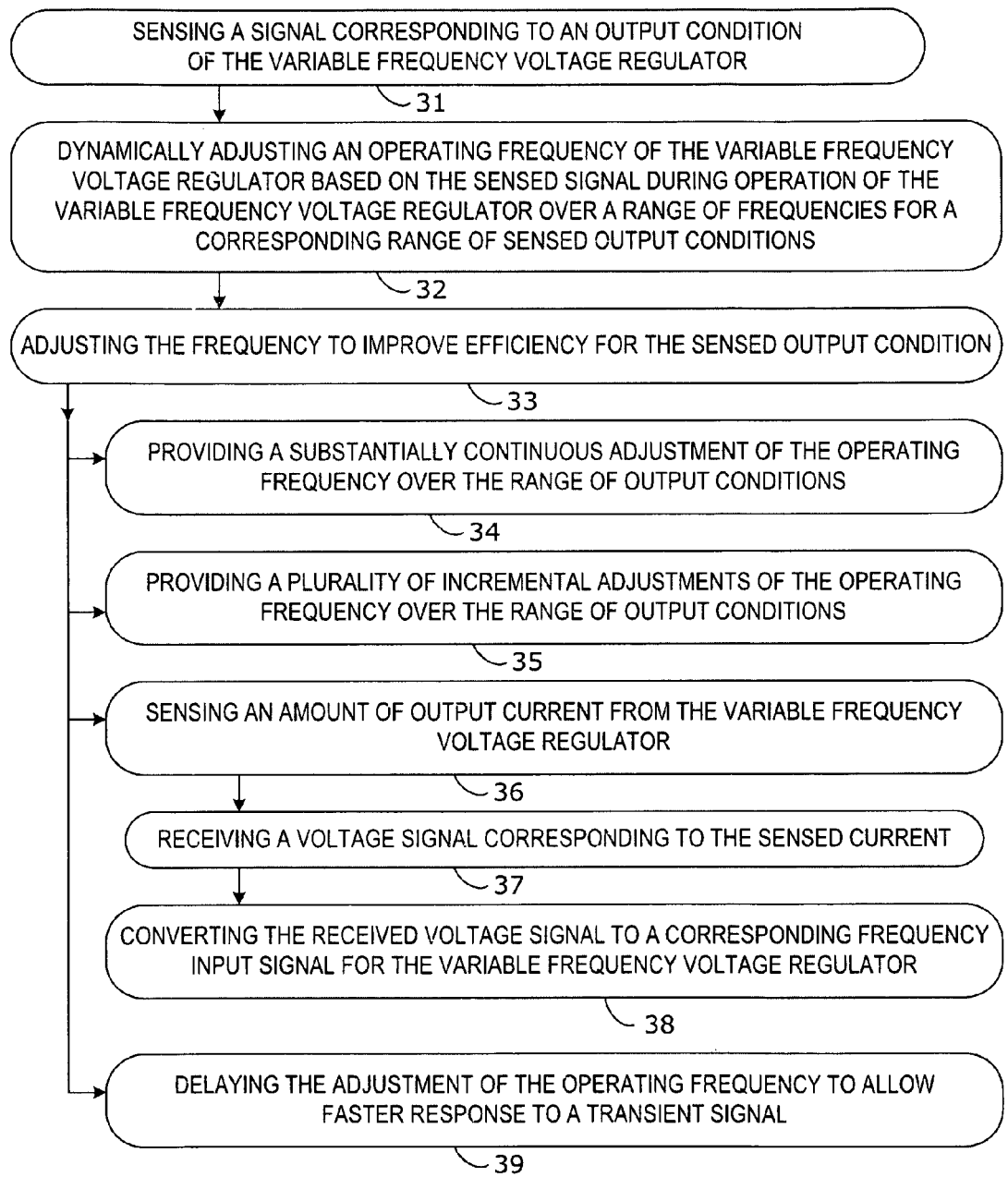
FIG. 3 is a flow diagram in accordance with some embodiments of the invention.

With reference to FIG. 3, in accordance with some embodiments of the invention, a method of operating a variable frequency voltage regulator may include sensing a signal corresponding to an output condition of the variable frequency voltage regulator (e.g. at block 31), and dynamically adjusting an operating frequency of the variable frequency voltage regulator based on the sensed signal during operation of the variable frequency voltage regulator over a range of frequencies for a corresponding range of sensed output conditions (e.g. at block 32). For example, dynamically adjusting the operating frequency of the variable frequency voltage regulator based on the sensed signal may include adjusting the frequency to improve efficiency for the sensed output condition (e.g. at block 33). For example, in some embodiments of the invention dynamically adjusting the operating frequency of the variable frequency voltage regulator based on the sensed signal may include providing a substantially continuous adjustment of the operating frequency over the range of output conditions (e.g. at block 34). For example, in some embodiments of the invention dynamically adjusting the operating frequency of the variable frequency voltage regulator based on the sensed signal may include providing a plurality of incremental adjustments of the operating frequency over the range of output conditions (e.g. at block 35). For example, in some embodiments of the invention dynamically adjusting the operating frequency of the variable frequency voltage regulator based on the sensed signal may include delaying the adjustment of the operating frequency to allow faster response to a transient signal (e.g. at block 39).

For example, in some embodiments of the invention sensing the signal corresponding to the output condition of the variable frequency voltage regulator may include sensing an amount of output current from the variable frequency voltage regulator (e.g. at block 36). For example, in some embodiments of the invention dynamically adjusting the operating frequency of the variable frequency voltage regulator based on the sensed signal may include receiving a voltage signal corresponding to the sensed current (e.g. at block 37), and converting the received voltage signal to a corresponding frequency input signal for the variable frequency voltage regulator (e.g. at block 38).

Without being limited to theory of operation, efficiency may affected by a voltage regulator switching frequency. For example, the switching losses may be directly affected by frequency. For example, the gate drive losses may also be directly affected by frequency. For example, these losses may affect efficiency by several percent. The ratio of these losses along with the $I^2R$ losses may affect the efficiency at a given load. For example, ripple losses in the inductor and copper losses may be affected by frequency inversely (e.g. these losses increase with lower frequency). The difference in efficiency can vary by several percent for a given load by varying the frequency. Advantageously, some embodiments of the invention may vary the voltage regulator switching frequency to provide an improved or optimum frequency for a given load.

In some electronic systems a controller frequency may be fixed at point which provides lowest power loss at the higher or highest output current ranges of the voltage regulator. However, this setting may not be optimum for other load conditions (e.g. medium and lighter loads). Advantageously, some embodiments of the invention may utilize a variable frequency oscillator of the controller that may be adjusted by the output current to provide an improved or optimum frequency for a wide range of output current conditions (e.g. the full range).

Figure 4:
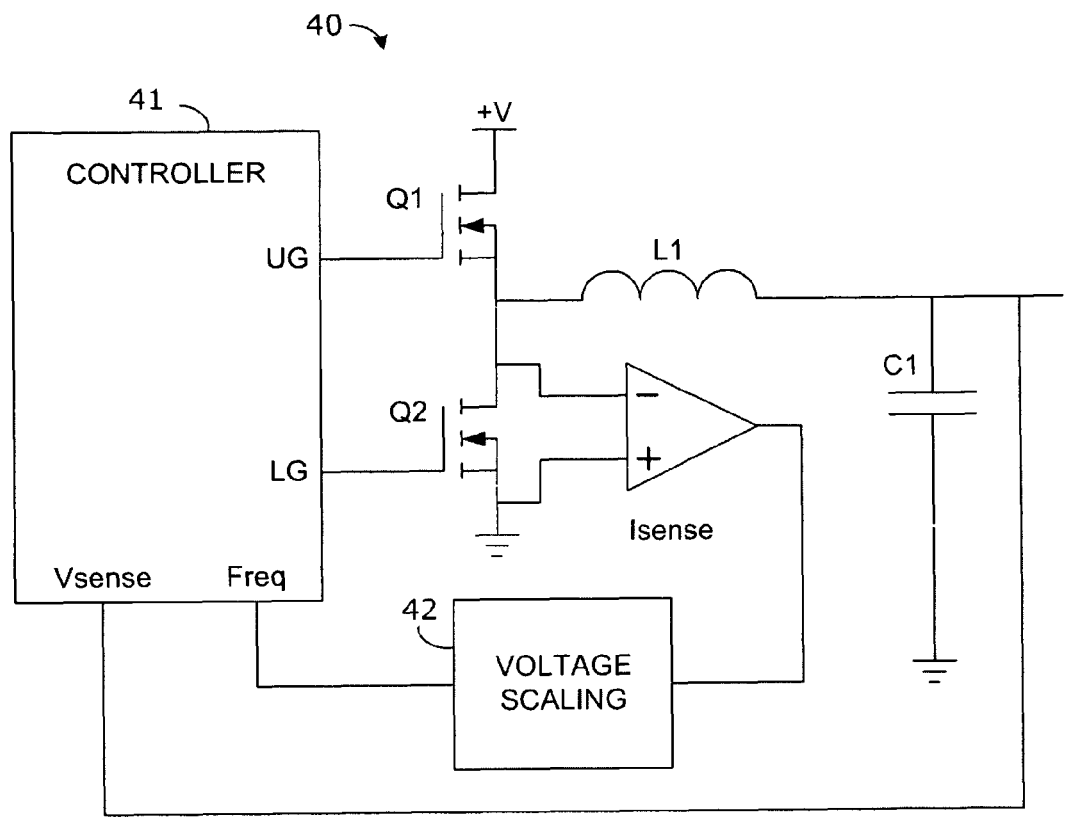
FIG. 4 is a schematic diagram of a voltage regulator controller circuit in accordance with some embodiments of the invention.

With reference to FIG. 4, a voltage regulator device 40 in accordance with some embodiments of the invention may include a controller 41 which provides an upper gate control signal (UG), a lower gate control signal (LG) and receives a voltage sense input signal (Vsense) and a frequency input signal (Freq). For example, the controller 41 may set a switching frequency for the voltage regulator device 40 based on the frequency input signal Freq. The controller 41 provides the upper gate signal UG to the gate of a first transistor Q1 (e.g. a power MOSFET device). The controller 41 provides the lower gate signal LG to the gate of a second transistor Q2 (e.g. also a power MOSFET device). The two transistors respective drain and source signals are connected in series between a power supply voltage (+V) and ground. An output for the voltage regulator device 40 may be taken from the junction of the two transistors Q1 and Q2 and provide to a load (e.g. a processor-based system). The output may include and LC circuit (e.g. inductor L1 and capacitor C1).

A current sense circuit Isense may be coupled to the second transistor Q2 to sense an amount of output current for the VR. For example, the VR output current may be sensed by measuring the voltage drop across the bottom MOSFET Q2 when it is turned on. Those skilled in the art will understand that numerous other circuits and techniques may be utilized to sense the VR output current. A voltage scaling circuit 42 may be coupled to the current sense circuit Isense. For example, the switching frequency of the voltage regulator device 40 may be adjusted by the current sense circuit Isense and the voltage scaling circuit 42, which converts the sensed output current to a voltage signal coupled to the frequency input signal Freq of the controller 41.

For example, the current signal from Isense may be modified from a linear representation of current to a voltage signal producing a desired corresponding frequency. The sensed current signal may be modified by analog means, by digital means, or by any combination of these or any other means. For example, the voltage scaling circuit 42 may include an analog to digital converter (ADC) coupled to a memory device coupled to a digital to analog converter (DAC). The ADC may convert an analog signal from the current sense circuit to a first digital value corresponding to the output condition of the voltage regulator device 40. The first digital value may be utilized to index a lookup table (e.g. stored in the memory device) which holds a second digital value which corresponds to a desired switching frequency for the voltage regulator device 40. The second digital value may be provided to the DAC to output an appropriate signal to the frequency input signal Freq of the controller 41. Those skilled in the art will understand that numerous other circuits and techniques may be utilized to convert the sensed output current signal to a corresponding frequency input signal Freq for the controller 41.

Figure 5:
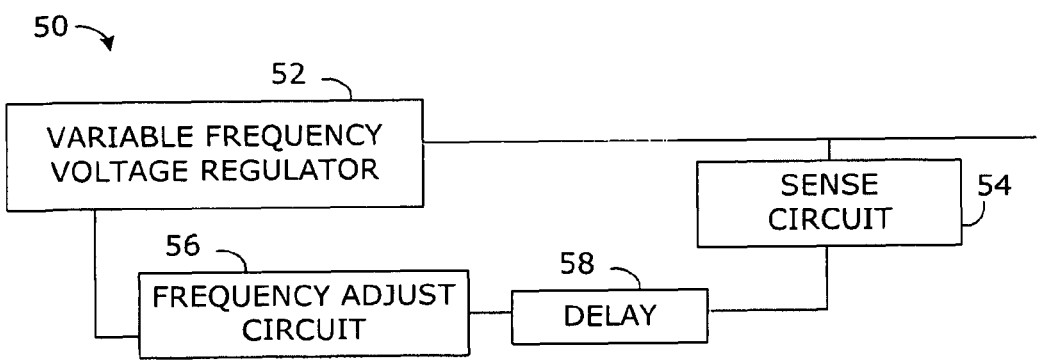
FIG. 5 is a block diagram of another voltage regulator device in accordance with some embodiments of the invention.

With reference to FIG. 5, in accordance with some embodiments of the invention a voltage regulator device 50 may include a variable frequency voltage regulator 52, a sense circuit 54 coupled to an output of the variable frequency voltage regulator 52, the sense circuit 54 to sense a signal corresponding to an output condition of the variable frequency voltage regulator 52, and a frequency adjust circuit 56 coupled between the sense circuit 54 and the variable frequency voltage regulator 52, the frequency adjust circuit 56 to dynamically adjust an operating frequency of the variable frequency voltage regulator 52 based on the signal sensed by the sense circuit 54 during operation of the variable frequency voltage regulator 52. For example, the frequency adjust circuit 56 may be configured to adjust the operating frequency of the variable frequency voltage regulator 52 over a range of frequencies for a corresponding range of sensed output conditions. For example, in some embodiments of the invention the frequency adjust circuit 56 may be configured to adjust the frequency to improve efficiency for the sensed output condition.

In accordance with some embodiments of the invention, the voltage regulator device 50 may further include a delay circuit 58 coupled between the sense circuit 54 and the frequency adjust circuit 56. Advantageously, in some embodiments of the invention the addition of the delay circuit 58 may improve handling of transients. For example, when going from idle load to full load, relatively fast operation may be required for the voltage regulator to reduce or minimize negative-going transients. With higher frequency operation, the controller can respond faster. Advantageously, the delay circuit 58 may introduce a delay in the signal from the sense circuit 56 to allow the drop in frequency to be delayed to allow the variable frequency voltage regulator 52 time to catch the low-going transient before lowering the frequency for better efficiency. In accordance with some embodiments of the invention, when the load turns off, the delay may be bypassed for rapid recovery from the load.

Figure 6:
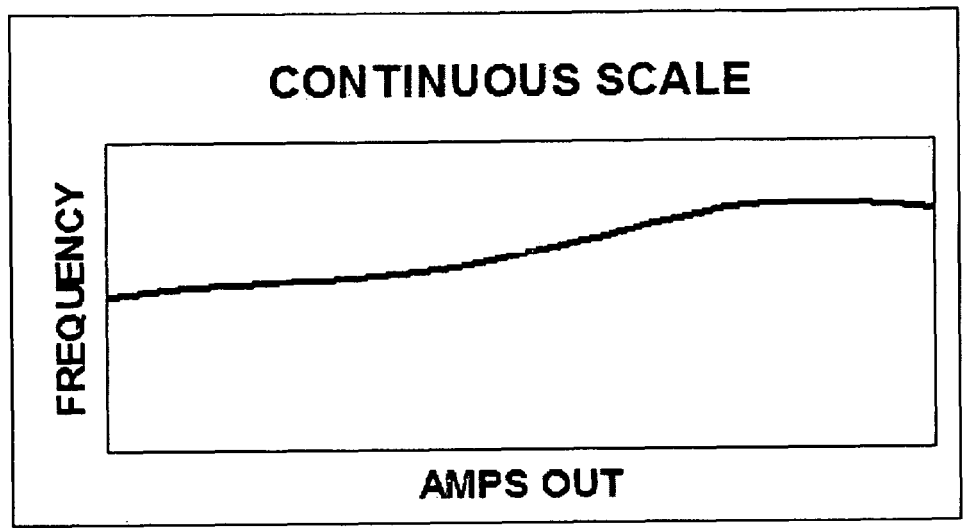
FIG. 6 is a graph of amps out versus frequency on a continuous scale in accordance with some embodiments of the invention.

With reference to FIG. 6, an analog voltage scaling circuit or a highly granular digital voltage scaling circuit may be utilized to provide a substantially continuous adjustment of the switching frequency.

Figure 7:
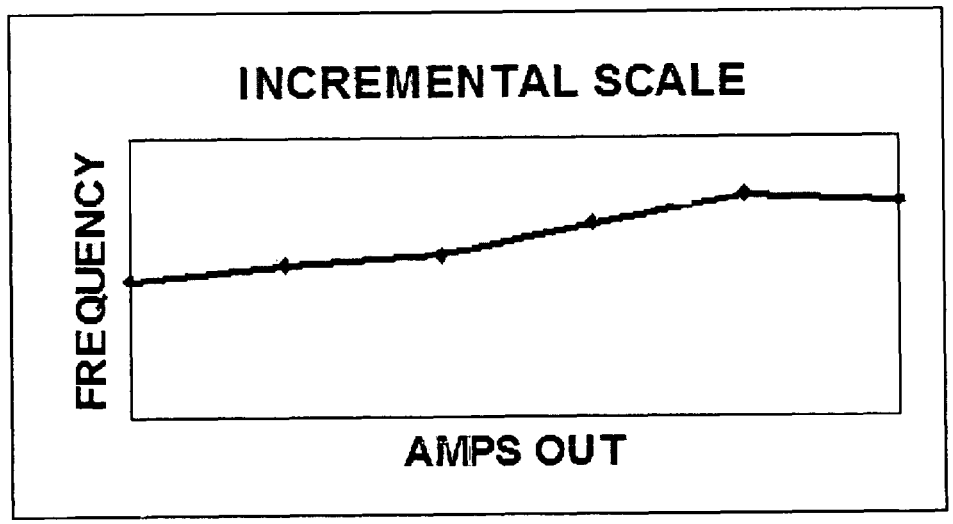
FIG. 7 is a graph of amps out versus frequency on an incremental scale in accordance with some embodiments of the invention.

With reference to FIG. 7, an alternative technique may be utilized to provide incremental or step-wise adjustment of the switching frequency at several different points of the VR output.

Figure 8:
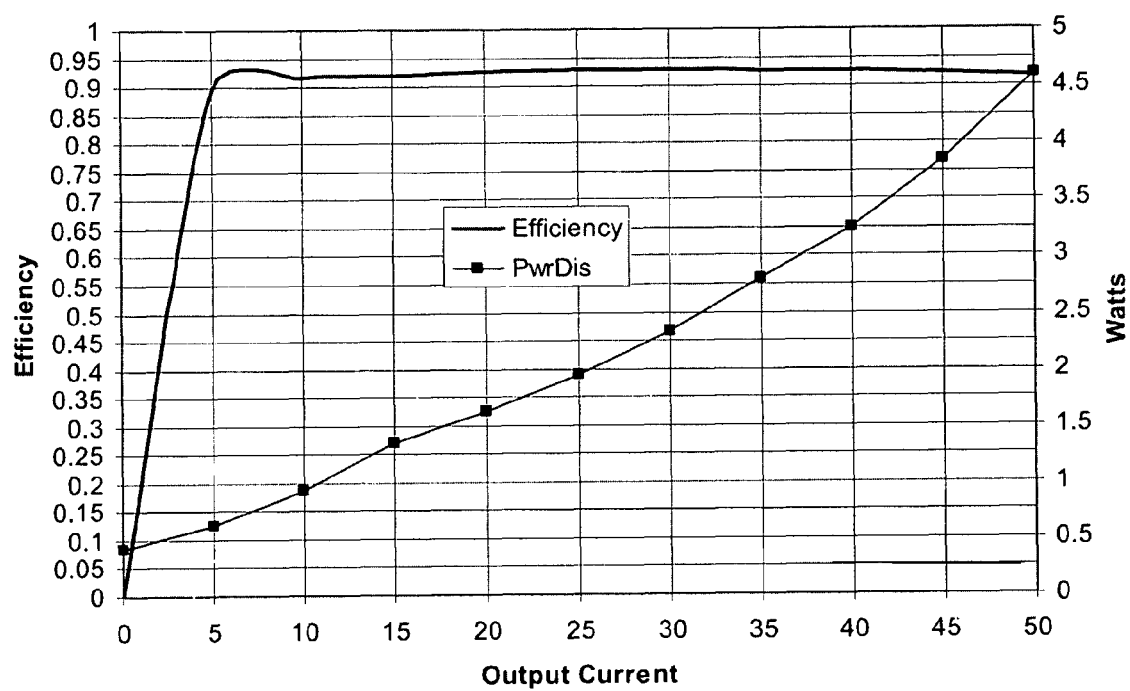
FIG. 8 is a graph of efficiency versus output current in accordance with some embodiments of the invention.

With reference to FIG. 8, Table 1 below is illustrated in graphical representation for selected values of an example in accordance with some embodiments of the invention. As is apparent from Table 1, different frequencies are utilized at different operating conditions. Advantageously, in accordance with some embodiments of the invention the switching frequency may be dynamically adjusted based on the load condition to improve or optimized efficiency.

TABLE 1

| Vout | Aout | CnvrtAin | DrvAin | Efficiency | PwrDis | Frequency |
|---|---|---|---|---|---|---|
| 1.03707 | 0 | 0.0228 | 0.044 | 0 | 0.414568 | 261 kHz |
| 1.03302 | 5.01 | 1.0808 | 0.048 | 0.893047 | 0.619818 | 357 kHz |
| 1.02915 | 10.006 | 2.1586 | 0.045 | 0.9171 | 0.930841 | 322 kHz |
| 1.02542 | 15.009 | 3.2469 | 0.045 | 0.919644 | 1.344785 | 322 kHz |
| 1.02074 | 20.01 | 4.27 | 0.066 | 0.926094 | 1.629993 | 259 |

TABLE 1-continued

| Vout | Aout | CnvrtAin | DrvAin | Efficiency | PwrDis | Frequency |
|---|---|---|---|---|---|---|
| 1.0167 | 25.0125 | 5.3178 | 0.068 | 0.929111 | 1.940259 | 268 kHz |
| 1.01265 | 30.022 | 6.3799 | 0.067 | 0.928642 | 2.336116 | 268 kHz |
| 1.00859 | 35.019 | 7.4414 | 0.068 | 0.926643 | 2.796071 | 276 kHz |
| 1.00473 | 40.014 | 8.505 | 0.061 | 0.925274 | 3.246834 | 234 kHz |
| 1.00052 | 45.018 | 9.5775 | 0.062 | 0.921398 | 3.842341 | 242 kHz |
| 0.99659 | 50.02 | 10.6766 | 0.062 | 0.915589 | 4.595764 | 242 kHz |

Those skilled in the art will understand that various embodiments of the invention may be utilized in connection with single phase or multi-phase power supplies (e.g. any number of phases may be used). Those skilled in the art will likewise understand that various embodiments of the invention may be utilized in connection with any topology such as coupled inductor topology, transformer topology or any other VR topology, step up or step down.

The foregoing and other aspects of the invention are achieved individually and in combination. The invention should not be construed as requiring two or more of such aspects unless expressly required by a particular claim. Moreover, while the invention has been described in connection with what is presently considered to be the preferred examples, it is to be understood that the invention is not limited to the disclosed examples, but on the contrary, is intended to cover various modifications and equivalent arrangements included within the spirit and the scope of the invention.

What is claimed is:

1. A voltage regulator device, comprising:
a variable frequency voltage regulator coupled between a power supply and a load circuit;
a sense circuit directly connected to an output of the variable frequency voltage regulator, the sense circuit to sense a signal corresponding to an output condition of the variable frequency voltage regulator, wherein the sense circuit is a current sense circuit and the output condition is an amount of output current from the variable frequency voltage regulator;
a frequency adjust circuit connected between the sense circuit and the variable frequency voltage regulator, the frequency adjust circuit to dynamically adjust an operating frequency of the variable frequency voltage regulator based on the signal sensed by the sense circuit during operation of the variable frequency voltage regulator; and
a delay circuit coupled between the sense circuit and the frequency adjust circuit,
wherein the frequency adjust circuit is configured to dynamically adjust the operating frequency of the variable frequency voltage regulator over a range of frequencies for a corresponding range of sensed output conditions to provide a substantially optimal operating frequency for a current load of the load circuit, and to adjust the frequency to improve efficiency for the sensed output condition.

2. The voltage regulator device of claim 1, wherein the frequency adjust circuit is configured to provide a substantially continuous adjustment of the operating frequency over the range of output conditions.

3. The voltage regulator device of claim 1, wherein the frequency adjust circuit is configured to provide a plurality of incremental adjustments of the operating frequency over the range of output conditions.

4. The voltage regulator device of claim 1, wherein the frequency adjust circuit comprises a voltage scaling circuit configured to receive a voltage signal from the current sense circuit and to convert the received voltage signal to a corresponding input signal coupled to a frequency input of the variable frequency voltage regulator.

5. A method of operating a variable frequency voltage regulator, comprising:
   sensing, via a sense circuit, a signal corresponding to an output condition of the variable frequency voltage regulator directly from the output of the variable frequency voltage regulator, wherein the sense circuit is a current sense circuit and the output condition is an amount of output current from the variable frequency voltage regulator; and
   dynamically adjusting, via a frequency adjust circuit, an operating frequency of the variable frequency voltage regulator based on the sensed signal during operation of the variable frequency voltage regulator over a range of frequencies for a corresponding range of sensed output conditions to provide a substantially optimal operating frequency for a current load of the load circuit,
   wherein dynamically adjusting the operating frequency of the variable frequency voltage regulator based on the sensed signal includes adjusting the frequency to improve efficiency for the sensed output condition, and delaying the adjustment of the operating frequency to allow faster response to a transient signal.

6. The method of operating a variable frequency voltage regulator of claim 5, wherein dynamically adjusting the operating frequency of the variable frequency voltage regulator based on the sensed signal comprises:
   providing a substantially continuous adjustment of the operating frequency over the range of output conditions.

7. The method of operating a variable frequency voltage regulator of claim 5, wherein dynamically adjusting the operating frequency of the variable frequency voltage regulator based on the sensed signal comprises:
   providing a plurality of incremental adjustments of the operating frequency over the range of output conditions.

8. The method of operating a variable frequency voltage regulator of claim 5, wherein dynamically adjusting the operating frequency of the variable frequency voltage regulator based on the sensed signal comprises:
   receiving a voltage signal corresponding to the sensed current; and
   converting the received voltage signal to a corresponding frequency input signal for the variable frequency voltage regulator.

9. An electronic system, comprising:
   a power supply;
   a load circuit; and
   a voltage regulator device coupled between the power supply and the load circuit, wherein the voltage regulator device includes:
      a variable frequency voltage regulator;
      a sense circuit directly connected to an output of the variable frequency voltage regulator, the sense circuit to sense a signal corresponding to an output condition of the variable frequency voltage regulator, wherein the sense circuit is a current sense circuit and the output condition is an amount of output current from the variable frequency voltage regulator;
      a frequency adjust circuit connected between the sense circuit and the variable frequency voltage regulator, the frequency adjust circuit to dynamically adjust an operating frequency of the variable frequency voltage regulator based on the signal sensed by the sense circuit during operation of the variable frequency voltage regulator; and
      a delay circuit coupled between the sense circuit and the frequency adjust circuit,
   wherein the frequency adjust circuit is configured to adjust the operating frequency of the variable frequency voltage regulator over a range of frequencies for a corresponding range of sensed output conditions to provide a substantially optimal operating frequency for a current load of the load circuit, and to adjust the frequency to improve efficiency for the sensed output condition.

10. The electronic system of claim 9, wherein the frequency adjust circuit is configured to provide a substantially continuous adjustment of the operating frequency over the range of output conditions.

11. The electronic system of claim 9, wherein the frequency adjust circuit is configured to provide a plurality of incremental adjustments of the operating frequency over the range of output conditions.

12. The electronic system of claim 9, wherein the frequency adjust circuit comprises a voltage scaling circuit configured to receive a voltage signal from the current sense circuit and to convert the received voltage signal to a corresponding input signal coupled to a frequency input of the variable frequency voltage regulator.

13. The electronic system of claim 9, wherein the power supply comprises a battery.

14. The electronic system of claim 9, wherein the load circuit comprises a processor.

* * * * *